US010300642B2

(12) United States Patent
Gaudin

(10) Patent No.: US 10,300,642 B2
(45) Date of Patent: May 28, 2019

(54) INJECTION MOLD AND ASSOCIATED INJECTION METHOD

(71) Applicant: JP GROSFILLEY, Martignat (FR)

(72) Inventor: Philippe Gaudin, Groissiat (FR)

(73) Assignee: JP GROSFILLEY, Martignat (FR)

( * ) Notice: Subject to any disclaimer, the term of this patent is extended or adjusted under 35 U.S.C. 154(b) by 110 days.

(21) Appl. No.: 15/283,691

(22) Filed: Oct. 3, 2016

(65) Prior Publication Data

US 2017/0095954 A1   Apr. 6, 2017

(30) Foreign Application Priority Data

Oct. 2, 2015   (FR) ...................... 15 59394

(51) Int. Cl.
| | | |
|---|---|---|
| B29C 45/14 | (2006.01) | |
| B29C 45/16 | (2006.01) | |
| B29C 45/26 | (2006.01) | |
| B29C 45/40 | (2006.01) | |
| B29C 45/33 | (2006.01) | |
| B29C 33/12 | (2006.01) | |

(52) U.S. Cl.
CPC ........ B29C 45/14008 (2013.01); B29C 33/12 (2013.01); B29C 45/1628 (2013.01); B29C 45/1671 (2013.01); B29C 45/2681 (2013.01); B29C 45/40 (2013.01)

(58) Field of Classification Search
CPC ........ B29C 2045/338; B29C 45/14008; B29C 45/1628; B29C 45/1671; B29C 45/2681; B29C 45/40
See application file for complete search history.

(56) References Cited

U.S. PATENT DOCUMENTS

| | | | | |
|---|---|---|---|---|
| 4,734,023 A | * | 3/1988 | Nesch ................. | B29C 45/1628 425/130 |
| 2004/0184273 A1 | * | 9/2004 | Reynolds ............... | A47K 13/24 362/394 |
| 2006/0249876 A1 | | 11/2006 | Koyama et al. | |
| 2007/0184273 A1 | * | 8/2007 | MacDonald .......... | B29C 45/045 428/411.1 |

FOREIGN PATENT DOCUMENTS

| | | | |
|---|---|---|---|
| EP | 0 742 090 A1 | 11/1996 | |
| EP | 1 060 868 A1 | 12/2000 | |
| EP | 2191950 A1 * | 6/2010 | ......... B29C 45/0062 |
| JP | 2010179511 A * | 8/2010 | |

OTHER PUBLICATIONS

Partial machine translation of JP 2010-179511 A dated Aug. 2010 obtained from the espace website. (Year: 2010).*

* cited by examiner

*Primary Examiner* — Robert B Davis
(74) *Attorney, Agent, or Firm* — Oliff PLC

(57) ABSTRACT

An injection mold including at least one first mold portion, at least a second mold portion positioned facing the first mold portion, the first portion or the second portion of the mold being configured to be axially movable relative to respectively the second portion or the first mold portion between at least an opening position of the injection mold and a closing position of the injection mold, at least one first workstation called injection station, and at least a second workstation called insert laying station and/or an ejection station. An injection method implemented by the injection mold.

11 Claims, 5 Drawing Sheets

INJECTION MOLD AND ASSOCIATED INJECTION METHOD

Figure 1:
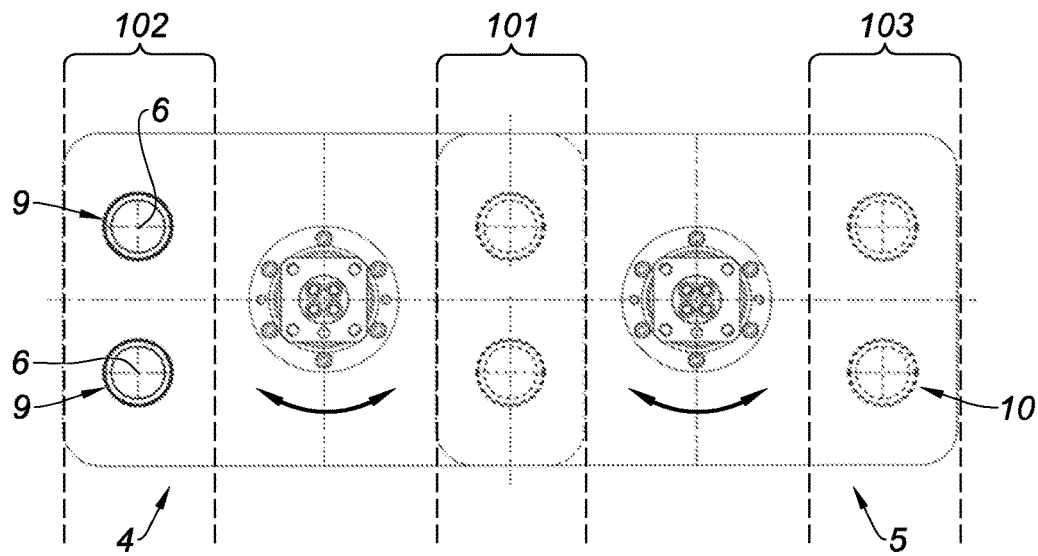

The present invention concerns the field of plastic injection molds and more particularly injection molds allowing obtaining bi-material parts and/or parts with an insert.

In the present invention, it is meant by "insert" a part that is included in another one when obtaining said other part by molding, for example. The insert according to the invention can be in the form of a label, a film or a part, for example.

To lay an insert, several solutions exist. A first solution consists of performing the ejection and the laying of the insert when the injection mold is open. This first solution is the least expensive but has the disadvantage of adding the time of ejection and laying to the injection time in a cycle.

A second known solution consists of injecting the finished part(s) and laying the insert(s) during the ejection. This second solution is most often performed on a vertical injection press because the insert is secured in the molding cavity by the effect of gravity. However, the second solution can be adapted for a horizontal press, the holding of the insert must then be secured by magnetization of the insert, for example. In the second known solution, the injection mold comprises at least two movable portions mounted in rotation on a vertical axis, one of the movable portions being dedicated to the injection and the other of the movable portions being dedicated to the ejection of the finished parts and the laying of insert. The second known solution has the disadvantage of having a long and unprofitable cycle time.

The invention aims to overcome all or part of the aforementioned disadvantages by boosting the cycle time and reducing it as much as possible.

The object of the invention is an injection mold comprising at least one first mold portion, at least a second mold portion positioned facing the first mold portion, the first or the second mold portion being configured to be axially movable relative to respectively the second or the first mold portion between at least an opening position of the injection mold and a closing position of the injection mold, at least one first workstation called injection station, and at least a second workstation called insert laying station, the first mold portion comprising:
- at least one first movable charger configured to move at least in rotation, at east between the first station and the second station, said first charger being positioned between the first mold portion and the second mold portion,
- at least one first molding cavity intended to be positioned at the first station and at least a second molding cavity intended to be positioned at the second station, the second mold portion comprising:
- at least a second charger positioned between the first charger and the second mold portion, the second charger being arranged at least partially facing the first charger,
- at least a first complementary molding cavity intended to be positioned at the first station and configured to cooperate with the first molding cavity of the first mold portion intended to be positioned at the first station, so as to delimit a molding space when the injection mold is in the closing position and when the first complementary molding cavity (7) is positioned facing the first molding cavity (6) of the first mold portion (2) positioned at the first station (101), characterized in that in that, when the injection mold is in the closing position, the second station is configured and arranged to be accessible from outside of the injection mold while the first station is inaccessible.

With this configuration, the second station can be used in ejection and/or laying operations of insert, for example, requiring the outer accessibility to the injection mold simultaneously with the parallel injection of a part at the first station in closed injection mold. Thus, the cycle time is considerably reduced and optimized since the injection is not disturbed by the opening of the injection mold for access to the insert ejection or laying station, which allows to simultaneously produce several parts without delaying the production cycle.

Preferably, the first mold portion is stationary.

Preferably, the second mold portion is axially movable relative to the first mold portion along a transverse axis of the injection mold.

According to one characteristic of the invention, the first charger is configured to move at least in rotation and preferably in rotation and in translation.

According to one characteristic of the invention, the second charger is configured to move at least in rotation and preferably in rotation and in translation.

According to one characteristic of the invention, the first charger moves in translation towards the second charger and/or the second charger moves in translation towards the first charger.

According to one characteristic of the invention, the injection mold comprises a third station called ejection station.

According to one characteristic of the invention, the second charger is configured to move at least in rotation at least between the first station and the third station. Thus, the second charger is partially positioned facing the first charger, in this configuration only the first station is common to the first charger and to the second charger.

According to one characteristic of the invention, the third station is configured and arranged to be accessible from outside of the injection mold when said injection mold is in the closing position, which allows ejecting the formed part without opening of the injection mold and, simultaneously with the ejection, injecting another part as well as the laying of an insert on the second station.

According to one characteristic of the invention, the molding cavities of the first mold portion are die cavities or core cavities and respectively the complementary molding cavities of the second mold portion are core or die cavities.

Preferably, the molding cavities of the first injection mold portion are die cavities and respectively the complementary molding cavities of the second portion are core cavities.

According to one characteristic of the invention, the injection mold can comprise at least a fourth workstation of overmolding or assembling or cooling or injecting another material, or heating or ratcheting or mirror welding or welding by overmolded seal or decoration laying or laser marking.

According to one characteristic of the invention, the fourth station is configured and arranged to be accessible from outside of the injection mold when the injection mold is in the closing position and depending on the activity associated with the workstation.

According to one characteristic of the invention, the second charger is movable between the first station, the third station and the fourth station.

According to one characteristic of the invention, the first charger is movable in translation in the direction of the second charger and/or the second charger is movable in translation in the direction of the first charger.

According to one characteristic of the invention, the injection mold is adapted for use in a horizontal or vertical press.

According to one characteristic of the invention, the injection mold is rotary.

The invention concerns an injection method implementing an injection mold according to the invention, for only one part, comprising the following steps:

a. laying of insert in a molding cavity positioned at the second station accessible from outside of the injection mold when the injection mold is closed, b. injection of a first material on the previously laid insert, the injection being performed in a molding space delimited by a first molding cavity and a first complementary molding cavity paired at the first station, when the injection mold is closed, c. ejection of the injected part with insert at the second station or a third station accessible from the outside of the injection mold when the injection mold is closed.

According to one characteristic of the invention, between the insert laying and/or injection and/or ejection steps, a translation step of the first charger or of the second charger respectively relative to the second charger or to the first charger is performed.

According to one characteristic of the invention, the insert laying and/or injection and/or ejection steps are performed simultaneously when several parts are performed in the injection mold at the same time.

According to one characteristic of the invention, at least one additional overmolding and/or cooling and/or second material injection and/or second insert laying step is performed before the ejection.

According to one characteristic of the invention, when at least three parts are in the course of production, at a time t, the production cycle is performed with the following steps:

a. closing of the injection mold, b. at the first station, injection of a material intended to form a first part in a molding space delimited by the first molding cavity and the first complementary molding cavity positioned at the first station on a previously laid insert at the second station, c. simultaneously with the injection step, at the second station, laying of an insert in the second molding cavity of the first mold portion, the insert being intended to be overmolded to form a second part in injection station, d. simultaneously with the injection step and insert laying step, at the third station, ejection of a third part previously formed in the insert laying station and injection station, e. repetition of the preceding steps.

Figure 4:
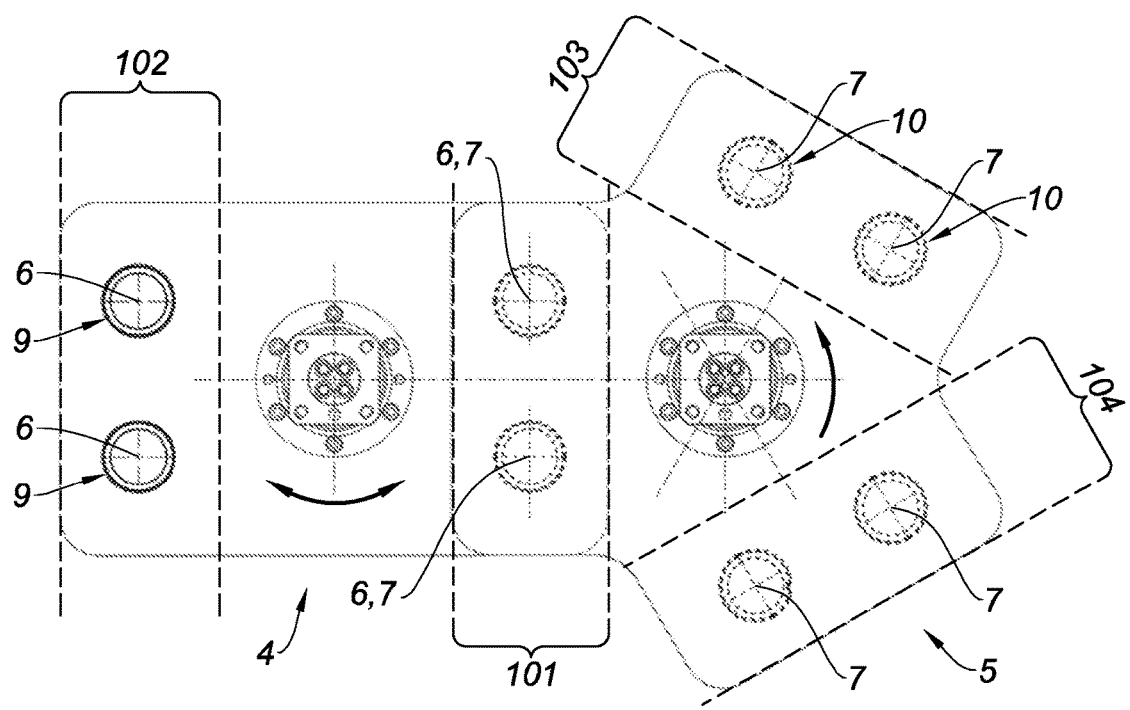
Figure 2:
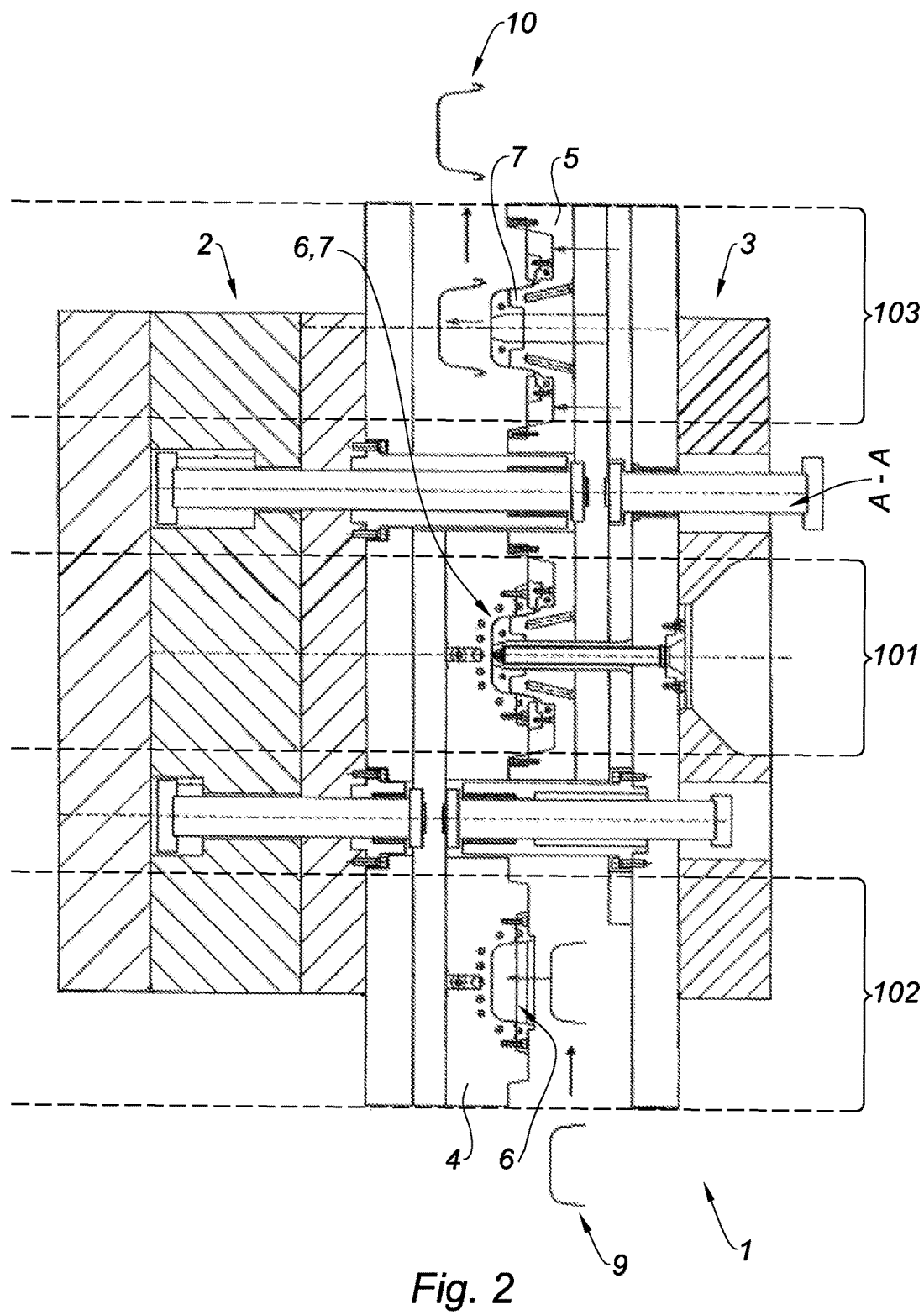
Figure 3:
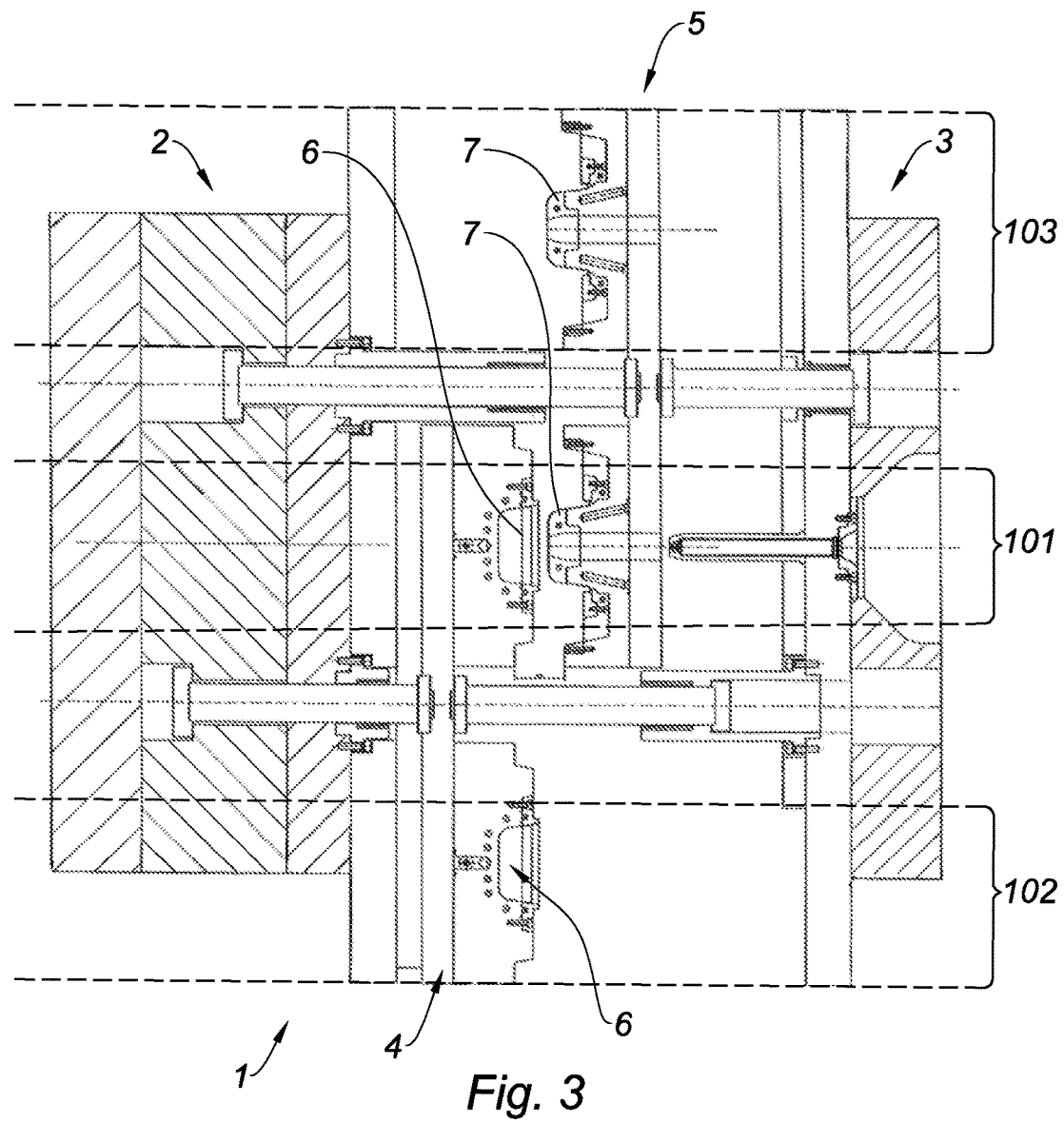
Figure 5:
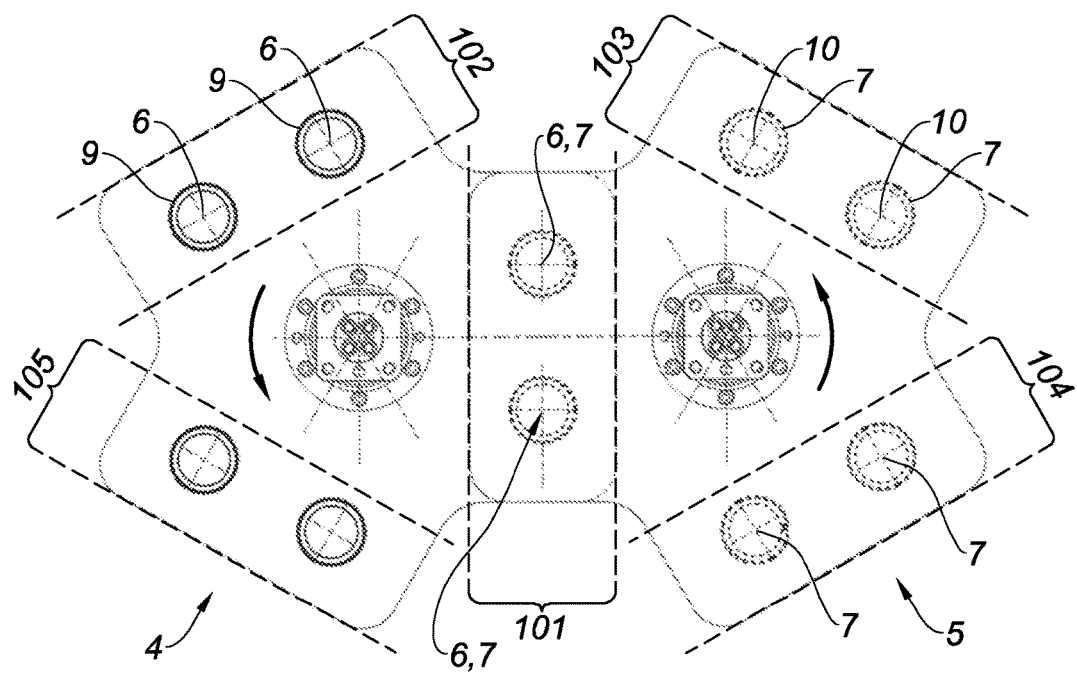
Figure 6:
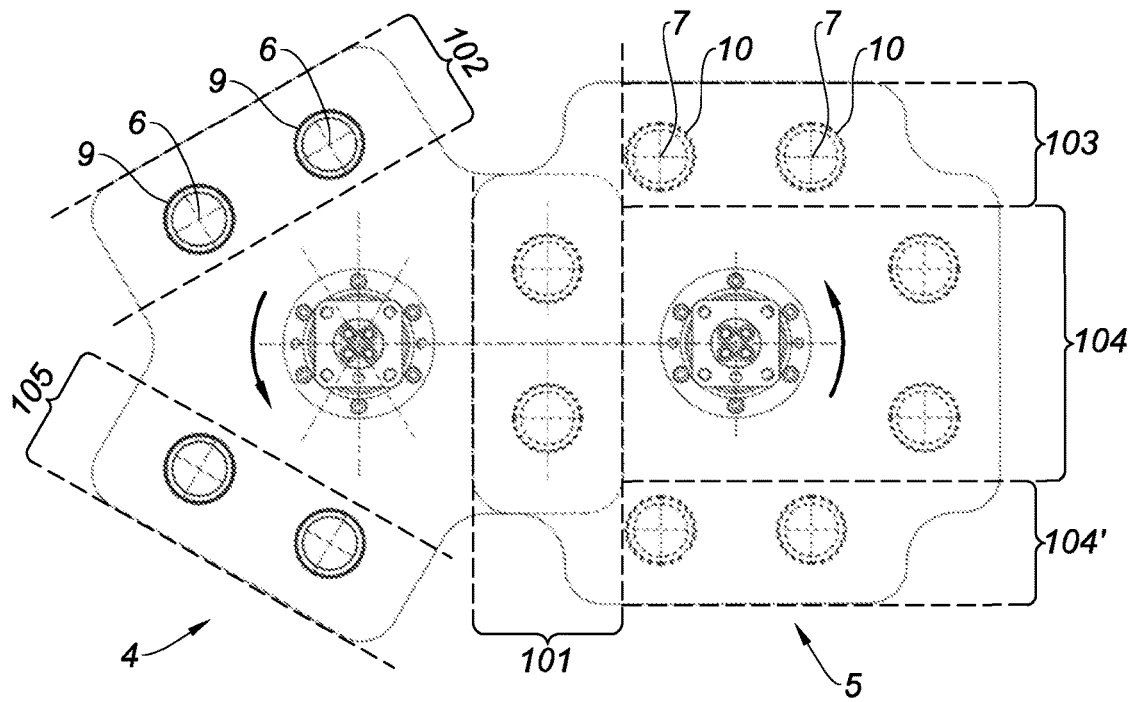
Figure 7:
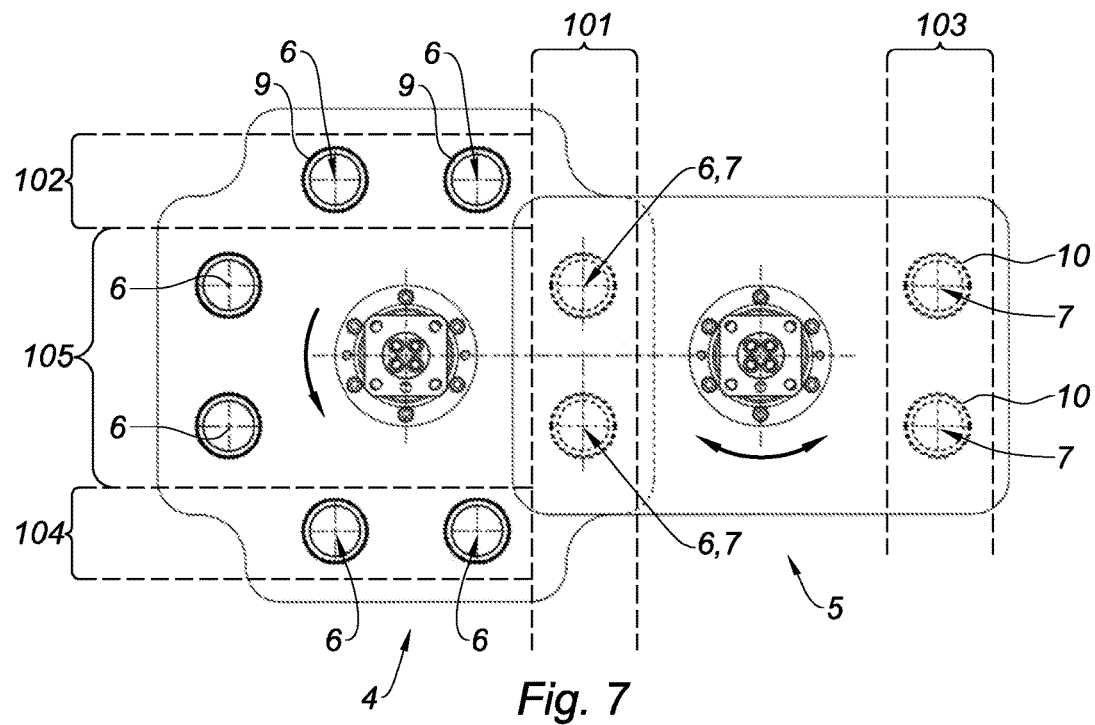
Figure 8:
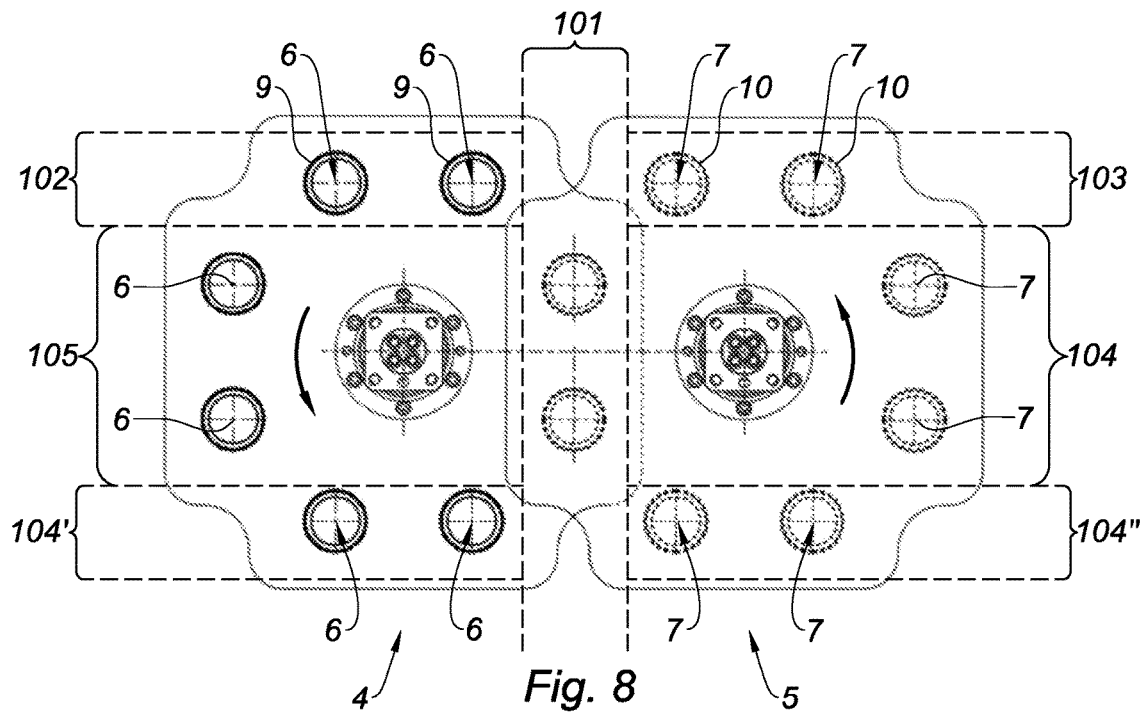

The invention will be better understood, thanks to the description below, which relates to embodiments according to the present invention, given by way of non-limiting examples and explained with reference to the accompanying schematic drawings, in which:

FIG. 1 is a top view of the injection mold chargers according to the invention according to a first configuration, FIG. 2 is a partial sectional view of the injection mold according to the invention according to the first configuration in the closing position of the injection mold, FIG. 3 is a partial sectional view of the injection mold according to the invention according to the first configuration in the opening position of the injection mold, FIG. 4 is a top view of the injection mold chargers according to the invention according to a second configuration, FIG. 5 is a top view of the injection mold chargers according to the invention according to a third configuration, FIG. 6 is a top view of the injection mold chargers according to the invention according to a fourth configuration, FIG. 7 is a top view of the injection mold chargers according to the invention according to a fifth configuration, FIG. 8 is a top view of the injection mold chargers according to the invention according to a sixth configuration, For the description of the injection mold which will follow and according to the invention, the injection mold can be used in a horizontal position or in a vertical position.

With reference to FIGS. 2 and 3, the injection mold 1 according to the invention comprises a first mold portion 2, a second mold portion 3. The first mold portion 2 is positioned facing the second mold portion 3.

As illustrated in FIGS. 2 and 3, the first mold portion 3 is fixed while the second mold portion 2 is axially movable relative to the first mold portion 3 along a transverse axis A-A of the injection mold.

The axial displacement of the second mold portion 3 is performed at least between an opening position illustrated in FIG. 3 and a closing position illustrated in FIG. 2.

The first mold portion 2 comprises a first movable charger 4 configured to move at least in rotation and preferably in rotation and in translation. The first charger 4 is positioned between the first mold portion 2 and the second mold portion 3 as seen in FIGS. 2 and 3.

The first mold portion 2 further comprises a first molding cavity 6, preferably a die-type molding cavity, as illustrated in FIGS. 2 and 3. The first mold portion 2 further comprises a second molding cavity 6, preferably a die-type molding cavity, as illustrated in FIGS. 2 and 3.

The second mold portion 3 further comprises a second movable charger 5 configured to move at least in rotation and preferably in rotation and in translation.

The second mold portion 3 further comprises a first complementary molding cavity 7, preferably a first core type molding cavity as illustrated in FIGS. 2 and 3. The first complementary molding cavity 7 is configured to cooperate with the first molding cavity 6 of the first mold portion 2 positioned at the first station 101, so as to delimit a molding space when the injection mold 1 is in the closing position and when the first complementary molding cavity 7 is positioned facing the first molding cavity 6 of the first mold portion 2 positioned at the first station 101.

In the example illustrated in FIGS. 2 and 3, the first charger 4 moves in translation towards the second charger 5 and/or the second charger 5 moves in translation towards the first charger 4.

Further, the injection mold 1 further comprises a plurality of workstations 101, 102, 103, 104, 104', 104", 105. More particularly, the injection mold 1 comprises a first station 101 called injection station, a second station 102 called insert laying station, a third station 103 called ejection station, a fourth station 104, 104', 104" called overmolding and/or assembling and/or cooling station, a fifth station 105 called second material injection station. Obviously, other stations can be considered within the scope of the invention.

In the figures representing each configuration of the injection mold 1, at each station, a pair of molding cavities and a pair of complementary molding cavities are shown. Of course, the number of molding cavities and of complementary molding cavities is not limited.

Whatever the configuration of the injection mold 1 according to the invention, when the injection mold 1 is in the closing position, the second station 102 is configured and arranged to be accessible from outside of the injection mold 1 while the first station 101 is inaccessible. Preferably, and as illustrated, the third station 103 is configured and arranged to be accessible from outside of the injection mold 1 when the injection mold 1 is in the closing position.

Whatever the configuration of the injection mold 1, the first charger 4 and the second charger 5 have a portion at the injection station 101 so that the first pair of molding cavities 6 of the first charger 4 and the first pair of complementary molding cavities 7 of the second charger 5 are paired in the closing position of the injection mold 1 and facing each other in the opening position of the injection mold 1.

Whatever the configuration of the injection mold 1, the second pair of molding cavities 6 of the first mold portion 2 positioned at the second station 102 is accessible from the outside of the injection mold 1 in the closing position of the injection mold 1. The second pair of complementary molding cavities 7 of the second mold portion 3 positioned at the third station 103 is accessible from the outside of the injection mold 1 in the closing position of the injection mold 1.

The first configuration of the injection mold 1 will now be described with reference to FIGS. 1 to 3.

According to the first configuration, the first charger 4 is movable in rotation between the first station 101 and second station 102. The second charger 5 is movable in rotation between the first station 101 and the third station 103.

The first mold portion 2 comprises a second pair of molding cavities 6 positioned at the second station 102. The second mold portion 3 further comprises a second pair of complementary molding cavities 7 arranged at the third station 103.

An injection cycle according to the injection method according to the invention is performed as described below, the method being implemented in an injection mold according to the invention and according to the first configuration and when at each station, only one molding cavity and only one complementary molding cavity are present. The production cycle described below concerns the production of only one part. First, an insert 9 is laid in the second molding cavity 6 of the first mold portion 2 at the second station 102, the injection mold being closed. Then, the injection mold 1 is opened and the first charger 4 disengages axially from the second charger 5 or vice versa so that the first charger 4 can rotate to bring the insert 9 at the first station 101 in the first molding cavity 6 of the first mold portion 2. The injection mold 1 is closed and a first material on the insert 9 is injected in the space delimited by the first molding cavity 6 and the first complementary molding cavity 7. Then, the injection mold 1 is opened and the second charger 5 disengages axially from the first charger 4 or vice versa so that the second charger 5 can rotate to bring the injected part 10 with insert 9 at the third station 103 for ejection.

The advantage of the injection mold according to the invention is that the various stations 101, 102, 103 can be used simultaneously to manufacture several parts 10.

Thus, when at least three parts are being produced, at a time t, the production cycle is as below. The injection mold 1 is closed. At the first station 101, a material intended to form a first part is injected in a molding space delimited by the first molding cavity and the first complementary molding cavity which are positioned at the first station 101 on a previously laid insert at the second station 102. Simultaneously with the injection step, at the second station 102, an insert is laid in the second molding cavity 6 of the first mold portion 2, the insert being intended to be overmolded to form a second part in injection station 101. Simultaneously with the injection step and insert laying step, at the third station 103, a third part previously formed in insert laying station 102 and in injection station 101 is ejected. The steps described above are repeated to simultaneously produce several parts.

In a non shown variant, for the formation of a same part, the insert laying step is performed after the injection step.

In another non shown variant, several insert laying steps can be performed before or after the injection step.

The second configuration of the injection mold 1 will now be described with reference to FIG. 4.

The second configuration of the injection mold 1 according to the invention differs from the first configuration in that the injection mold 1 comprises an additional station: a fourth station 104 called overmolding and/or assembling and/or cooling station.

According to the second configuration, the first charger 4 is movable in rotation between the first station 101 and the second station 102. The second charger 5 is movable in rotation between the first station 101, the fourth station 104 and the third station 103.

The first mold portion 2 comprises a second pair of molding cavities 6 positioned at the second station 102.

The second mold portion 3 comprises a second pair of complementary molding cavities 7 arranged at the third station 103. The second mold portion 3 further comprises a third pair of complementary molding cavities 7 arranged at the fourth station 104.

In a non shown variant, the first charger 4 is movable in rotation between the first position 101, the second station 102 and the fourth station 104. The second charger 5 is movable in rotation between the first station 101 and the third station 103. Thus, the first mold portion 2 comprises a second pair of molding cavities 6 positioned at the second station 102 and a third pair of molding cavities 6 arranged at the fourth station 104 and the second mold portion 3 comprises a second pair of complementary molding cavities 7 arranged at the third station 103.

An injection cycle according to the injection method according to the invention is performed as described below, the method being implemented in an injection mold according to the invention and according to the second configuration and when at each station, only one molding cavity and one complementary molding cavity are present. The production cycle described below concerns the production of only one part. First, an insert 9 is laid in the second molding cavity 6 of the first mold portion 2 at the second station 102, the injection mold being closed. Then, the injection mold 1 is opened and the first charger 4 disengages axially from the second charger 5 or vice versa so that the first charger 4 can rotate to bring the insert 9 at the first station 101 in the first molding cavity 6 of the first mold portion 2. The injection mold 1 is closed and a first material is injected on the insert 9 in the space delimited by the first molding cavity 6 and the first complementary cavity molding 7. Then, the injection mold 1 is opened and the second charger 5 disengages axially from the first charger 4 or the vice versa so that the second charger 5 can rotate to bring the injected part 10 with insert 9 at the fourth station 104. The injection mold 1 is closed and for example the injected part 10 with insert 9 is overmolded. Then, the injection mold 1 is opened and the second charger 5 disengages axially from the first charger 4 or vice versa so that the second charger 5 can rotate to bring the injected and overmolded part 10 with insert 9 at the third station 103 for ejection.

The advantage of the injection mold according to the invention is that the various stations 101, 102, 103 can be used simultaneously to manufacture several parts 10.

Thus, when at least four parts are being produced, at a time t, the production cycle is as below. The injection mold is closed 1. At the first station 101, a material intended to form a first part is injected in a molding space delimited by the first molding cavity and the first complementary molding cavity which are positioned at the first station 101 on a previously laid insert at the second station 102. Simultaneously with the injection step, at the second station 102, an insert is laid in the second molding cavity 6 of the first mold portion 2, the insert 9 being intended to be overmolded to form a second part in injection station 101. Simultaneously with the injection and insert laying steps at the fourth station 104, a third injected part 10 with insert 9 is overmolded. Simultaneously with the injection, insert laying and overmolding steps at the third station 103, a fourth part 10 previously formed in the first, second and fourth stations 101, 102, 104 is ejected.

The steps described above are repeated to produce several parts simultaneously depending on the number of molding cavities and of complementary molding cavities.

The third configuration of the injection mold 1 will now be described with reference to FIG. 5.

The third configuration differs from the first configuration in that the injection mold 1 comprises five stations: a fourth station 104 such as the one described in the second configuration and a fifth injection station 105 of a second material, for example.

According to the third configuration, the first charger 4 is movable in rotation between the first station 101, the second station 102 and the fifth station 105. The second charger 5 is movable in rotation between the first station 101, the fourth station 104 and the third station 103.

The first mold portion 2 comprises a second pair of molding cavities 6 positioned at the second station 102. The first mold portion 2 further comprises a third pair of molding cavities 6 positioned at the fifth station 105.

The second mold part 3 comprises a second pair of complementary molding cavities 7 arranged at the third station 103. The second mold portion 3 further comprises a third pair of complementary molding cavities 7 arranged at the fourth station 104.

The injection method implemented by an injection mold according to the third configuration is substantially identical to the injection method implemented by an injection mold 1 according to the second configuration with the exception of an additional step of injection of a second material performed after the laying of the insert 9. Thus, the injection method implemented by an injection mold according to the third configuration can be deduced without ambiguity from the injection method implemented by an injection mold according to the second configuration described above, whether for only one part or a plurality of parts.

In a non shown variant of the third configuration, the fourth 104 and fifth 105 stations are reversed. That is to say, the first charger 4 is movable in rotation between the first station 101, the second station 102 and the fourth station 104, the second charger 5 is movable in rotation between the first station 101, the fifth station 105 and the third station 103. Thus, the first mold portion 2 comprises a second pair of molding cavities 6 positioned at the second station 102 and a third pair of molding cavities 6 positioned at the fourth station 104. The second mold part 3 comprises a second pair of complementary molding cavities 7 arranged at the third station 103 and a third pair of complementary molding cavities 7 arranged at the fifth station 105.

The fourth configuration of the injection mold 1 will now be described with reference to FIG. 6.

The fourth configuration differs from the first configuration in that the injection mold 1 comprises six stations: a fourth station 104 such as the one described in the second configuration, a fifth injection station 105 such as the one described in the third configuration and a sixth station 104' corresponding to another overmolding and/or cooling and/or assembling station such as the fourth station 104.

According to the fourth configuration, the first charger 4 is movable in rotation between the first station 101, the second station 102 and the fifth station 105. The second charger 5 is movable in rotation between the first station 101, the fourth station 104, the sixth station 104' and the third station 103.

The first mold portion 2 comprises a second pair of molding cavities 6 positioned at the second station 102. The first mold portion 2 further comprises a third pair of molding cavities 6 positioned at the fifth station 105.

The second mold portion 3 comprises a second pair of complementary molding cavities 7 arranged at the third station 103. The second mold portion 3 further comprises a third pair of complementary molding cavities 7 arranged at the fourth station 104. The second mold portion 3 further comprises a fourth pair of complementary molding cavities 7 arranged at the sixth station 104'.

The injection method implemented by an injection mold according to the fourth configuration is substantially identical to the injection method implemented by an injection mold 1 according to the third configuration with the exception of an additional overmolding and/or cooling and/or assembling step performed after the first overmolding and/or cooling and/or assembling step at the fourth station 104. Thus, the injection method implemented by an injection mold according to the fourth configuration can be deduced without ambiguity from the injection method implemented by an injection mold according to the third configuration described above, whether for only one part or a plurality of parts.

In a non shown variant of the fourth configuration, the fourth 104 and fifth 105 stations are reversed. That is to say, the first charger 4 is movable in rotation between the first station 101, the second station 102 and the fourth station 104, the second charger 5 is movable in rotation between the first station 101, the fifth station 105 and the third station 103. Thus, the first mold portion 2 comprises a second pair of molding cavities 6 positioned at the second station 102 and a third pair of molding cavities 6 positioned at the fourth station 104. The second mold portion 3 comprises a second pair of complementary molding cavities 7 arranged at the third station 103, a third pair of complementary molding cavities 7 arranged at the fifth station 105 and a fourth pair of complementary molding cavities 7 arranged at the sixth station 104'.

In another non shown variant, the first charger 4 is movable in rotation between the first station 101, the second station 102, the fifth station 105 and the sixth station 104', the second charger 5 is movable in rotation between the first station 101, the fourth station 104 and the third station 103, the step provided in the sixth station 104' being performed before step provided in the fifth station 105 or before the step provided in the first station 101.

In another non shown variant, the two previously described variants can be combined.

The fifth configuration of the injection mold 1 will now be described with reference to FIG. 7.

The fifth configuration differs from the first configuration in that the injection mold 1 comprises five stations: a fourth station 104 such as the one described in the second configuration and a fifth injection station 105 such as the one described in the third configuration.

According to the fifth configuration, the first charger 4 is movable in rotation between the first station 101, the second station 102, the fourth station 104 and the fifth station 105. The second charger 5 is movable in rotation between the first station 101 and the third station 103.

The first mold portion 2 comprises a second pair of molding cavities 6 positioned at the second station 102. The first mold portion 2 further comprises a third pair of molding cavities 6 positioned at the fourth station 104 and a fourth pair of molding cavities 6 positioned at the fifth station 105.

The second mold portion 3 comprises a second pair of complementary molding cavities 7 arranged at the third station 103.

The injection method implemented by an injection mold according to the fifth configuration is substantially identical to the injection method implemented by an injection mold 1 according to the first configuration with the exception of two additional steps performed before the injection step at the first station 101. Thus, the injection method implemented by an injection mold according to the fifth configuration can be deduced without ambiguity from the injection method implemented by an injection mold according to the first configuration described above, whether for only one part or a plurality of parts.

In a non shown variant, the first charger 4 is movable in rotation between the first station 101 and the second station 102 and the second charger 5 is movable in rotation between the first station 101, the fourth station 104, the fifth station 105 and the third station 103. Thus, the steps provided in the fourth and fifth stations 104, 105 are performed after the step provided in the first station 101.

The sixth configuration of the injection mold 1 will now be described with reference to FIG. 8.

The sixth configuration differs from the first configuration in that the injection mold 1 comprises seven stations: a fourth station 104 such as the one described in the second configuration, a fifth injection station 105 such as the one described in the third configuration, a sixth station 104' such as the one described in the fourth configuration and a seventh station 104" corresponding to another overmolding and/or cooling and/or assembling station such as the fourth station 104 and the sixth station 104'.

According to the sixth configuration, the first charger 4 is movable in rotation between the first station 101, the second station 102, the fifth station 105 and the sixth station 104. The second charger 5 is movable in rotation between the first station 101, the fourth station 104, the seventh station 104" and the third station 103.

The first mold portion 2 comprises a second pair of molding cavities 6 positioned at the second station 102. The first mold portion 2 further comprises a third pair of molding cavities 6 positioned at the fifth station 105 and a fourth pair of molding cavities 6 positioned at the sixth station 104'.

The second mold portion 3 comprises a second pair of complementary molding cavities 7 arranged at the third station 103. The second mold portion 3 further comprises a third pair of complementary molding cavities 7 arranged at the fourth station 104. The second mold portion 3 comprises a fourth pair of complementary molding cavities 7 arranged at the seventh station 104".

The injection method implemented by an injection mold according to the sixth configuration is substantially identical to the injection method implemented by an injection mold 1 according to the fifth configuration with the exception of two additional steps performed after the injection step at the first station 101. Thus, the injection method implemented by an injection mold according to the sixth configuration can be deduced without ambiguity from the injection method implemented by an injection mold according to the fifth configuration described above, whether for only one part or a plurality of parts.

In a non shown variant, the fourth station 104 and fifth 105 stations are reversed. Thus, the first charger 4 is movable in rotation between the first station 101, the second station 102, the fourth station 104 and the sixth station 104. The second charger 5 is movable in rotation between the first station 101, the fifth station 105, the seventh station 104" and the third station 103.

Other variants can be performed by inverting at the choice the fourth station 104, the fifth station 105, the sixth station 104' and seventh station 104" without departing from the scope the invention.

Of course, the invention is not limited to the configurations and embodiments described and shown in the accompanying Figures. Modifications remain possible, in particular from the point of view of the constitution of the various elements or by substitution of technical equivalents, without departing from the protection field of the invention.

The invention claimed is:

1. An injection mold comprising at least one first mold portion, at least a second mold portion positioned facing the first mold portion, the first mold portion or the second mold portion being configured to be axially movable relative to respectively the second portion or the first mold portion between at least an opening position of the injection mold and a closing position of the injection mold, at least one first workstation called injection station, and at least a second work station called insert laying station, the first mold portion comprising:
at least one first movable charger configured to move at least in rotation at least between the first station and the second station, said first charger being positioned between the first mold portion and the second mold portion,
at least one first molding cavity configured to be positioned at the first station and at least a second molding cavity configured to be positioned at the second station, the second mold portion comprising:
at least a second charger positioned between the first charger and the second mold portion, the second charger being arranged at least partially facing the first charger,
at least a first complementary molding cavity configured to be positioned at the first station and configured to cooperate with the first molding cavity of the first mold portion configured to be positioned at the first station, so as to delimit a molding space when the injection mold is in the closing position and so as the first complementary molding cavity is positioned facing the first molding cavity of the first mold portion positioned at the first station, wherein, when the injection mold is in the closing position, the second station is configured and arranged to be accessible from the outside of the injection mold while the first station is inaccessible, and wherein the injection mold comprises a third station called ejection station, the second charger being configured to move at least in rotation at least between the first station and the third station.

2. The injection mold according to claim 1, wherein the third station is configured and arranged to be accessible from the outside of the injection mold when said injection mold is in the closing position.

3. The injection mold according to claim 1, wherein the molding cavities of the first mold portion are die or core cavities and respectively the complementary molding cavities of the second mold portion are core or die cavities.

4. The injection mold according to claim 1, comprising at least a fourth workstation of overmolding or assembling or cooling or injecting another material or heating or ratcheting or mirror welding or welding by overmolded seal or decoration laying or laser marking.

5. The injection mold according to claim 4, wherein the fourth station is configured and arranged to be accessible from the outside of the injection mold when the injection mold is in the closing position.

6. The injection mold according to claim 3, wherein the second charger is movable between the first station, the third station and the fourth station.

7. The injection mold according to claim 1, wherein the first charger is movable in translation in direction of the second charger and/or the second charger is movable in translation in direction of the first charger.

8. An injection method implementing an injection mold according to claim 1, for only one part, comprising the following steps:

a. laying of insert in a second molding cavity positioned at the second station accessible from the outside of the mold when the injection mold is closed, b. injection of a first material on the previously laid insert, the injection being performed in a molding space delimited by a first molding cavity and a first complementary molding cavity paired at the first station, when the injection mold is closed, c. ejection of the injected part with insert at the second station or a third station accessible from the outside of the injection mold when the injection mold is closed.

9. The injection method according to claim 8, wherein, between the insert laying and/or injection and/or ejection steps, a translating step of the first charger or of the second charger relative to respectively the second charger or to the first charger is performed.

10. The injection method according to claim 8, wherein the insert laying and/or injection and/or ejection steps are performed simultaneously when several parts are performed in the injection mold at the same time.

11. The injection method according to claim 8, wherein at least one additional overmolding and/or cooling and/or second material injection and/or second insert laying step is performed before the ejection step.

* * * * *